United States Patent
Lauder

(10) Patent No.: US 8,849,628 B2
(45) Date of Patent: Sep. 30, 2014

(54) SOFTWARE APPLICATION FOR RANKING LANGUAGE TRANSLATIONS AND METHODS OF USE THEREOF

(76) Inventor: Andrew Nelthropp Lauder, San Jose, CA (US)

( * ) Notice: Subject to any disclaimer, the term of this patent is extended or adjusted under 35 U.S.C. 154(b) by 253 days.

(21) Appl. No.: 13/448,393

(22) Filed: Apr. 16, 2012

(65) Prior Publication Data

US 2012/0265518 A1    Oct. 18, 2012

Related U.S. Application Data

(60) Provisional application No. 61/475,766, filed on Apr. 15, 2011.

(51) Int. Cl.
*G06F 17/28* (2006.01)

(52) U.S. Cl.
CPC .................................. *G06F 17/2854* (2013.01)
USPC ............... 703/3; 703/2; 703/4; 703/9; 703/10

(58) Field of Classification Search
CPC ............................. G06F 17/28; G06F 17/2836
USPC ............................................. 704/3, 4, 9, 270
See application file for complete search history.

(56) References Cited

U.S. PATENT DOCUMENTS

| | | | | |
|---|---|---|---|---|
| 5,477,451 A | * | 12/1995 | Brown et al. | 704/9 |
| 2005/0027669 A1 | * | 2/2005 | Day et al. | 707/1 |
| 2007/0150444 A1 | * | 6/2007 | Chesnais et al. | 707/3 |
| 2007/0294076 A1 | * | 12/2007 | Shore et al. | 704/2 |
| 2008/0288241 A1 | * | 11/2008 | Noda | 704/4 |
| 2009/0326913 A1 | * | 12/2009 | Simard et al. | 704/2 |
| 2012/0035908 A1 | * | 2/2012 | Lebeau et al. | 704/2 |

* cited by examiner

*Primary Examiner* — Vincent P Harper

(57) ABSTRACT

The software application is used to rank language translations and a method to implement those ranked language translations. The language translations are for textual or vocal phrases that a user wants to convert from its original language to a preferred language. The software application will refer to a variety of translation sources in order to create a set of applicable translations for a textual or vocal phrase. The software application will then rank each applicable translation with an accuracy score, which is weighed by three factors: the commonalities between the set of translation sources, a user input process, and a linguistic mapping process. Some methods to implement the ranked language translations include using accelerometer data from a electronic communication device to operate the software application, integrating a moderator into a conversation process, using subtitles in speech bubbles for a video chat, and using location data to communicate with different contacts.

15 Claims, 6 Drawing Sheets

Algorithm 3:
*"Acceleromater Translation Activation"*

Algorithm 2:
*"Symmetrical Linguistic Input Mapping"*

| Language 1 (English) Input Phrase | Language 2 (Spanish) Translation Results |
|---|---|
| *"What's your name?"* | *"¿Cómo se llama?"* |
|  | *"¿Cuál es tu nombre?"* |

| Results as Inputted Phrases | Number of Times Requested |
|---|---|
| *"¿Cómo se llama?"* | *1287* |
| *"¿Cuál es tu nombre?"* | *380* |

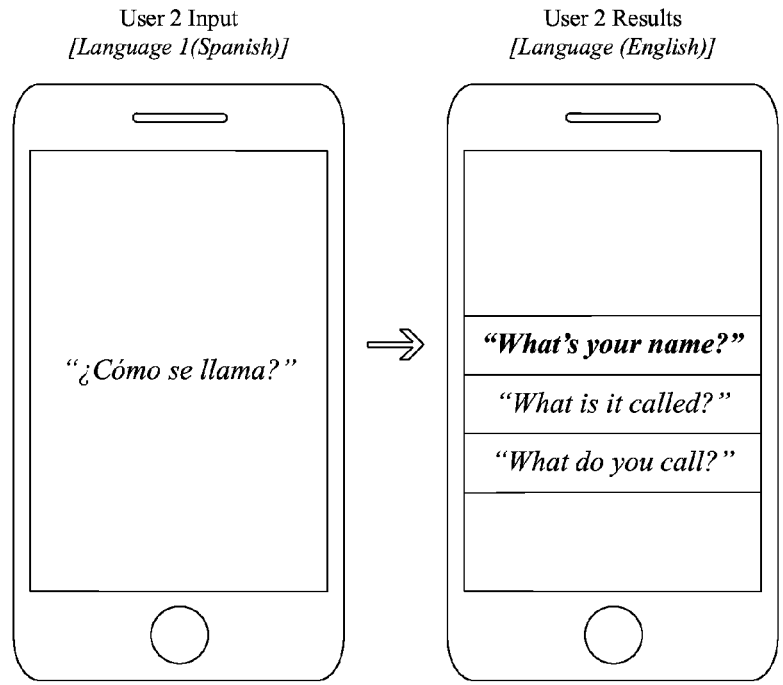

User 2 Input
[Language 1(Spanish)]

User 2 Results
[Language (English)]

"¿Cómo se llama?" ⇒ *"What's your name?"* / "What is it called?" / "What do you call?"

| Language 1 (Spanish) Input Phrase | Language 2 (English) Translation Results |
|---|---|
| "¿Cómo se llama?" | *"What's your name?"* |
| | "What is it called?" |
| | "What do you call?" |

| Results as Inputted Phrases | Number of Times Requested |
|---|---|
| "What's your name?" | *2310* |
| "What is it called?" | *840* |
| "What do you call?" | *16* |

FIG. 2B

SOFTWARE APPLICATION FOR RANKING LANGUAGE TRANSLATIONS AND METHODS OF USE THEREOF

The current application is a non-provisional application and claims a priority to the U.S. provisional patent application Ser. No. 61/475,766 filed on Apr. 15, 2011. The current application is filed on Apr. 16, 2012 while Apr. 15, 2012 was on a weekend.

FIELD OF THE INVENTION

The present invention relates generally to a method of language translation, language translation correction and feedback, display of translation results promoting matching target language input phrases, accelerometer-based activation/trigger of speech recording, language translation, input/output language swapping and relative output language audio playback, translation moderation, and video chat subtitling—enabling video chat translation with visual cues.

BACKGROUND OF THE INVENTION

This invention is a series of five (5) algorithms that define a human/machine translation service that learns and becomes more accurate with every user interaction. Functionalities supporting a Language Translation system leveraging a combination of Machine Translations, Human Translation Databases, Human Translators, User & Recipient multiple-choice rating and free-form correction (Algorithm 1); Symmetrical Linguistic Input Mapping (Algorithm 2); Accelerometer Translation Activation (Algorithm 3); Moderator Integration (Algorithm 4); Video Chat/Calling Subtitling (Algorithm 5).

BRIEF DESCRIPTION OF THE DRAWINGS

FIG. 2B displays the symmetrical linguistic input mapping (Algorithm 2).

DETAILED DESCRIPTIONS OF THE INVENTION

Figure 1:
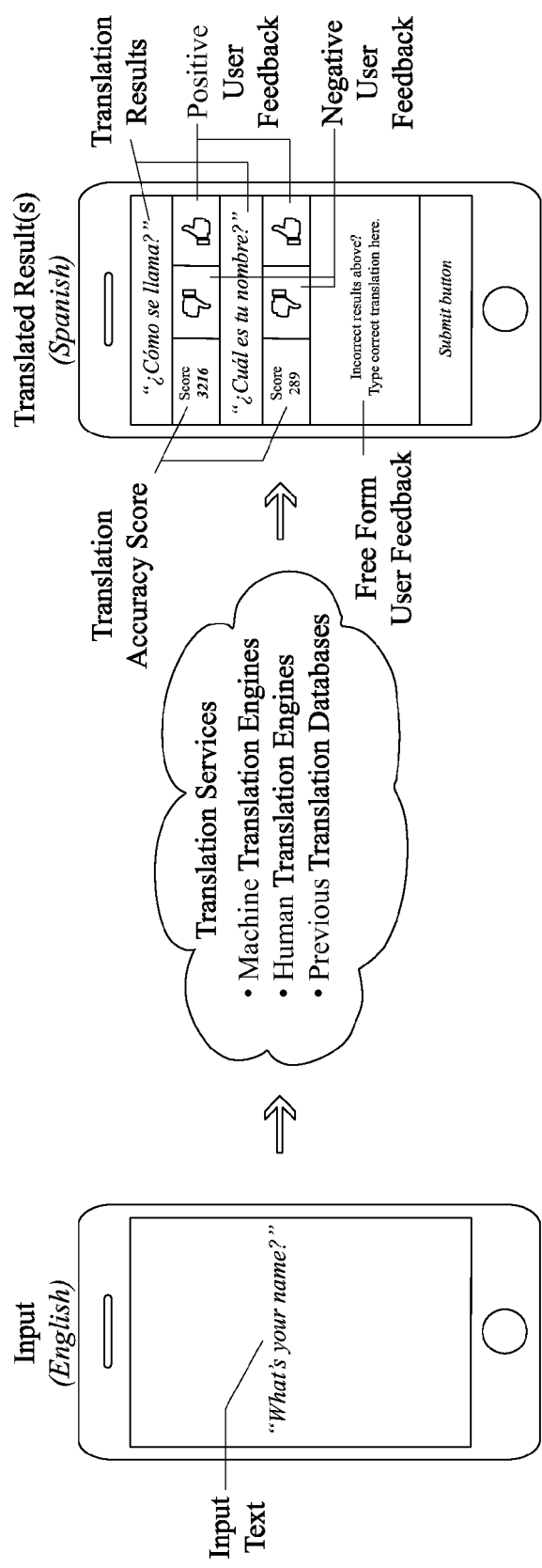
FIG. 1 displays the multiple-choice rating and free form correction (Algorithm 1).

All illustrations of the drawings are for the purpose of describing selected versions of the present invention and are not intended to limit the scope of the present invention.

The present invention is a software application that is used to rank language translations. The software application also includes a method to implement those ranked language translations. The software application contains a plurality of translation sources, which includes a machine language-translation engine, a human language-translation database, a language-translation storage database, and a parallel-language content database. The machine language-translation engine translates text or speech from one language to another language by using simple word substitution. The human language-translation engine provides human-aided translations for text or speech. The language-translation storage database allows the present invention to store previously completed translations by the software application. The parallel-language content database contains translations from language phrasebooks and other published documents.

The present invention uses a process to rank language translations. The process begins by retrieving a message in its original language through a user interface. The message is an input phrase in either text or speech that a user of the software application wants to have translated. The user interface allows the user to interact with the software application. The process for the software application continues by compiling a plurality of applicable translations for the message in the preferred language for the user. The plurality of applicable translations is found for the message by referring to the plurality of translation sources. The software application then determines an accuracy score for each of the plurality of applicable translations. The accuracy score is used to quantify how accurately each applicable translation should be able to convert the message from its original language to the preferred language. The accuracy score of a particular translation within the plurality of applicable translations is weighed based on the commonalities between the plurality of translation sources, a user input process, and a linguistic mapping process. The process proceeds by displaying each of the plurality of applicable translations with their accuracy score through the user interface, which allows the user to choose the best translation from the plurality of applicable translations. The process concludes by recording the plurality of applicable translations within the language-translation storage database, and each applicable translation is stored with a total rating and a total number of reverse requests, which are described hereinafter. The total rating and the total number of reverse requests for each of the applicable translations are continuously updated.

The present invention allows the software application to weigh the accuracy score of each applicable translation with three different methods. The first method is to increase the accuracy score of a particular translation if that particular translation is provided by more than one translation source. For example, if both the machine language-translation engine and the parallel content database provide a particular translation, then the accuracy score of that particular translation will be greater.

The second method is the user input process, which begins by prompting the user to choose between a positive rating and a negative rating for each applicable translation. The software application can then retrieve the positive rating or the negative rating for each of the plurality of applicable translations from the user through the user interface. The software application will then increase the total rating of a particular translation if that particular translation received a positive rating. The software application will also decrease the total rating of a particular translation if that particular translation received a negative rating. The total rating for each translation is the accumulation of positive ratings and negative ratings that is received over time by the translation. The process continues by prompting the user to enter a free form correction through the user interface if each of the plurality of applicable translations received a negative rating. The free form correction is a translation for the message from its original language to the preferred language that is created by the user because the user does not feel any of the applicable translations accurately depict the meaning of the message. The software application then retrieves the free form correction and stores the free form correction into the human language-translation database for future translation requests. The process concludes by assigning the free form correction as the best translation for the current message. For the second method, the software application increases the accuracy score of a particular translation if that particular translation has a higher total rating than the other applicable translations and decreases the accuracy score of a particular translation if that particular translation has a lower total rating than the other applicable translations.

Figure 2A:
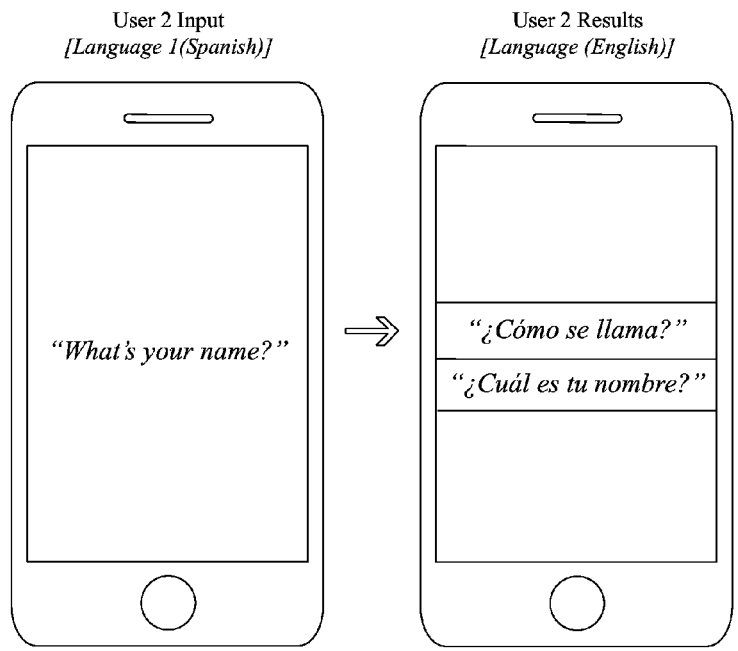
FIG. 2A displays the symmetrical linguistic input mapping (Algorithm 2).
Figure 3:
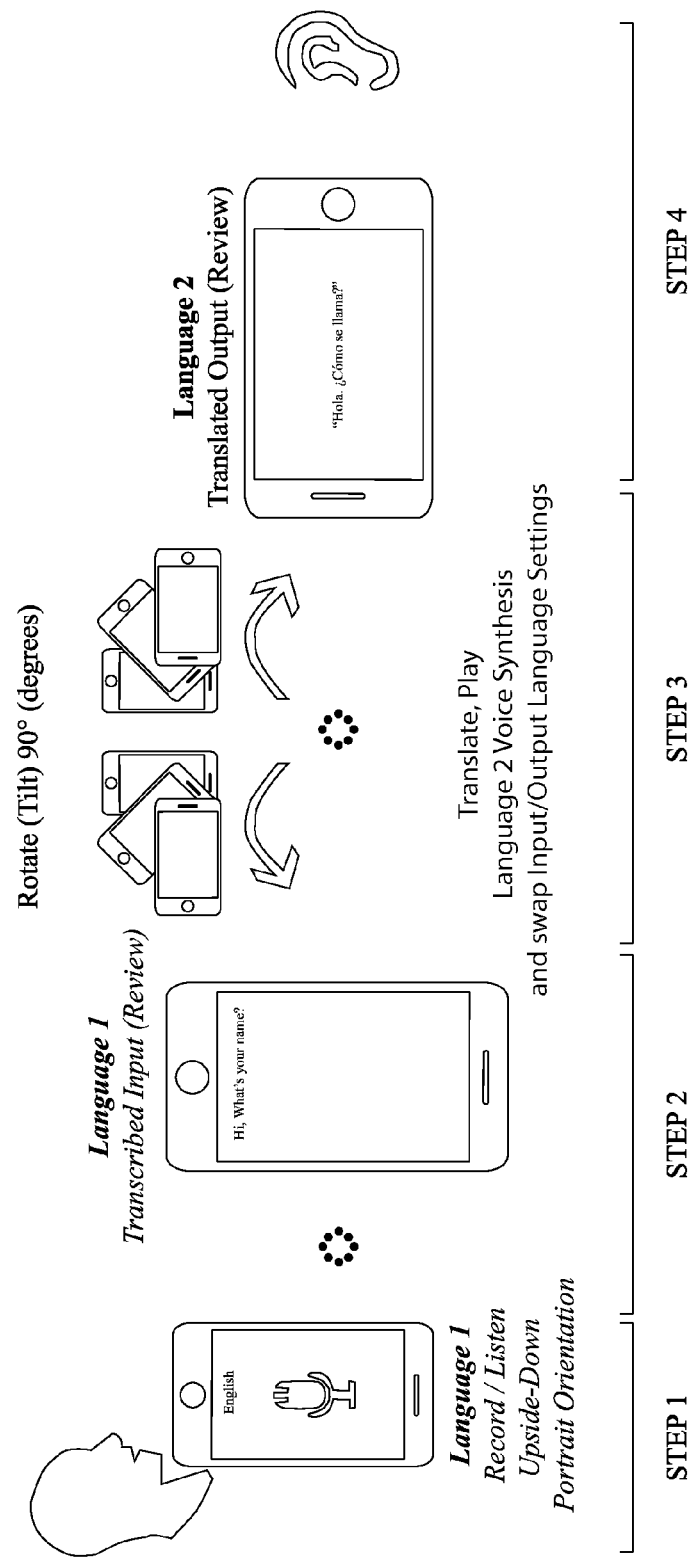
FIG. 3 displays the accelerometer translation activation (Algorithm 3).
Figure 4:
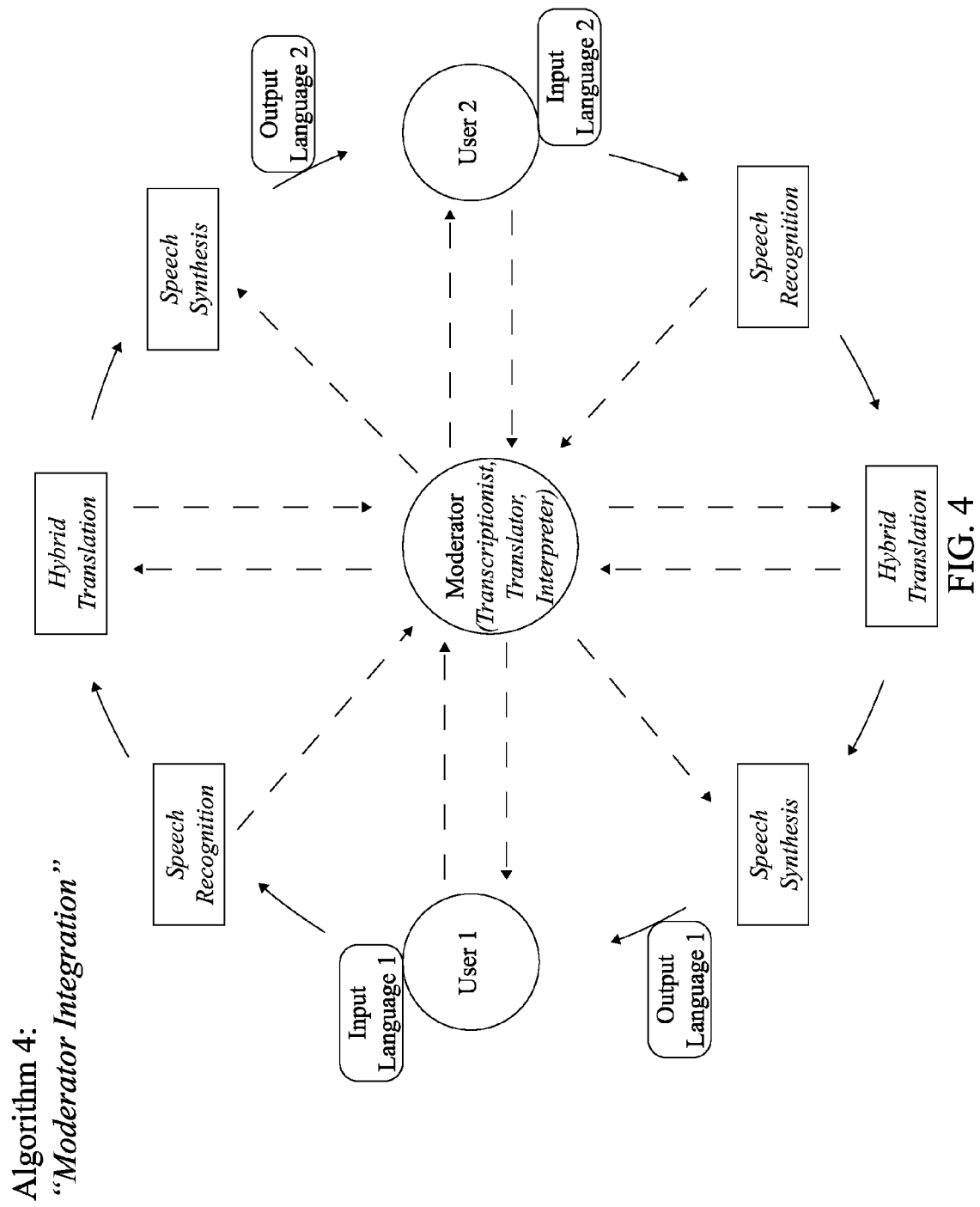
FIG. 4 displays the moderator integration (Algorithm 4).
Figure 5:
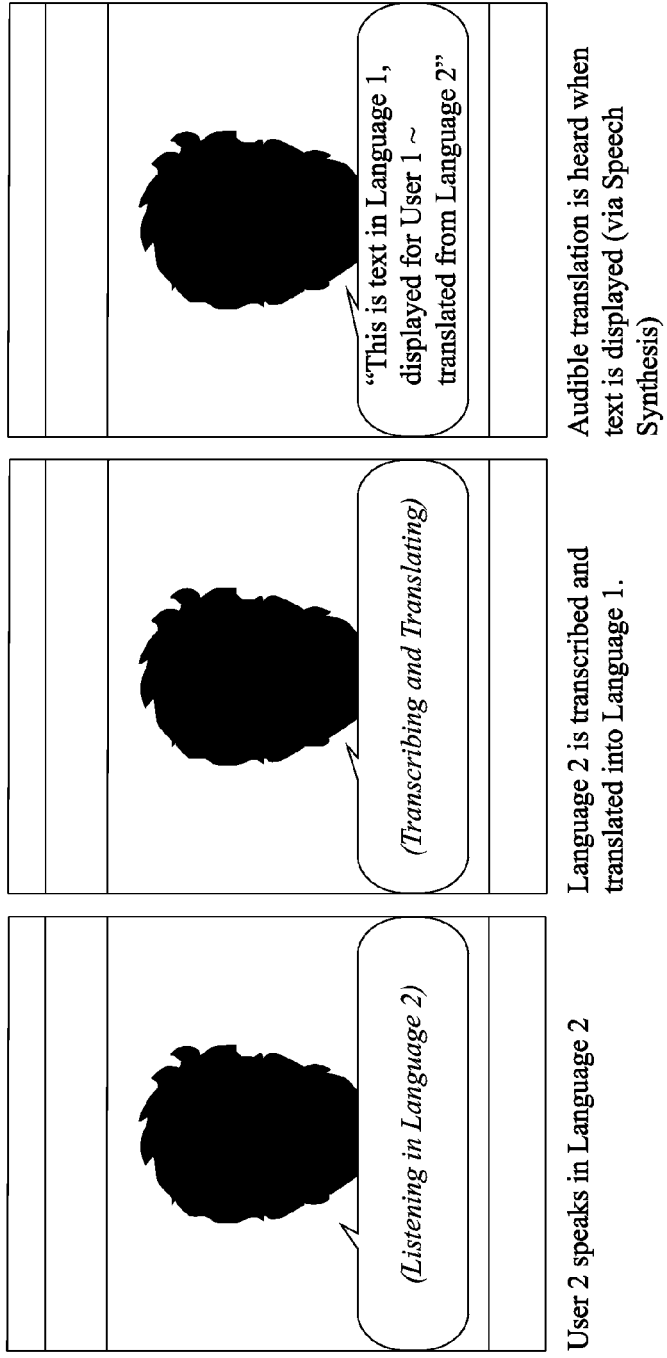
FIG. 5 displays the video chat/calling subtitling (Algorithm 5).

In reference to FIGS. 2A and 2B, the third method of weighing the accuracy score is by the total number of reverse requests for a particular translation by other users using the preferred language. Thus, the total number of reverse requests is the total number of times that a particular translation has been requested by other users initially using the software application with the preferred language instead of the original language. For the third method, the software application increases the accuracy score of a particular translation if that particular translation has a higher total number of reverse requests than the other applicable translations and decreases the accuracy score of a particular translation if that particular translation has a lower total number of reverse requests than the other applicable translations. For the example shown in FIG. 2B, shows that the software application receives many translations requests from Spanish to English for the phrase "¿Cómo se llama?" which the software application would respond with either: "What's your name?"; "What is it called?"; or "What do you call?". All three responses seem correct, but "What's your name?" is a more common translation request from English to Spanish according to the total number of reverse requests for each response, which can also be seen in FIG. 2B. Thus, the software application would increase the accuracy score of "What's your name?" more than the other two responses.

The present invention can implement the ranked language translations in a number of different communication applications. The software application uses a speech recognition engine and speech synthesis engine. The speech recognition engine converts speech data into textual data, and the speech synthesis engine converts textual data into speech data. The software application uses the ranking method in order to determine the best translation with the highest accuracy score from the plurality of applicable translations. The bilingual conversation process allows a user and their conversation partner to have a bilingual conversation with each other by using only one electronic communication device, which comprises an accelerometer, a microphone, and a speaker. The bilingual conversation process is focused around retrieving accelerometer data from the electronic communication device, which allows the user to activate different features of the software application while holding the electronic communication device in different positions. The software application will not do anything when it is receiving an upright signal from the accelerometer, which means that the electronic communication device is being held upright by the user. However, the software application will activate the microphone when it receives an upside-down signal from the accelerometer, which means the electronic communication device is being held upside by the user. Once the electronic communication device is turned upside-down, then the software application will begin to retrieve a voice message in a first language from the microphone. The software application will then use the speech recognition engine to transcribe the voice message into a textual message and will display the textual message in the first language on the user interface. The user can then tilt the electronic communication device to a 90 degree position so that the software application receives a tilt signal from the accelerometer. Once the software application receives the tilt signal, the software application will convert the textual message from the first language to a second language with the best translation with the highest accuracy score. The software application continues by displaying the textual message in the second language on the user interface so that the user and the user's conversation partner can view the textual message. Also for the tilt signal, the software application will convert the textual message into a voice message in the second language by the speech synthesis engine, and the voice message is sent to the speaker so that the user and the user's conversation partner can hear the voice message in the second language. The bilingual conversation process can be continuously repeated with the electronic communication device so that the user and the user's conversation partner can have a conversation with each other.

The bilingual communication process allows a first user and a second user to have a phone conversation between separate electronic communication devices, which respectively have a first user interface and a second user interface. The bilingual communication process can also be used for live voice call translation, live video call translation, translated messaging, spoken language audio stream (live or recorded), spoken language video stream (with audio, live or recorded), in-person translated conversations, and any translation request with text or audio input. The bilingual communication process begins by receiving a text or speech phrase in the first language through the first user interface. The speech phrase is sent to a server, where it is transcribed by the speech recognition engine into a textual phrase. The process continues by converting the textual phrase from the first language into the second language with the best translation that has the highest accuracy score. The textual phrase can be translated from the first language to the second language by a machine translation if the software application cannot find a suitable best translation. The software application will then convert the textual phrase into the voice phrase with the speech synthesis engine so that the text and/or voice phrase in the second language can be sent to the second user interface. The bilingual communication process is repeated between the first user and the second user for the entire length of the phone call conversation.

The unique aspect of the bilingual communication process is that a moderator will oversee the bilingual communication process so there are not any major mistranslations. The moderator is a professional translator and allows the present invention to leverage human translators. The moderator can intervene at different times during the bilingual communication process. The moderator can intervene right after the software application converts the textual phrase from the first language to the second language. This method of intervention by the moderator is seen as the least intrusive during the bilingual communication process because it creates the least lag time between the first user and the second user. The software application will correct the textual phrase in the second language according to the moderator's input, which is retrieved from a moderator interface. The moderator interface allows the moderator to access the software application and intervene during the bilingual communication process. In order for the moderator to intervene right after the textual phrase has been converted from the first language to the second language, the software application will have to display the textual phrase in the first language, the best translation, and the highest accuracy score through the moderator interface, which will allow the moderator to view this information. The software application will then prompt the moderator to accept or decline the best translation for the textual phrase in the first language. The moderator may decide to intervene if the accuracy score of the best translation is too low and/or if any of the applicable translations are incorrect. The software application can retrieve the moderator's input through the moderator interface if the best translation is decline by the moderator. When the moderator intervenes in this way, the translation process can be seen as a hybrid between the software application and the moderator. The moderator can also intervene by directly translate the voice phrase from said first language to the second language without using the speech recognition engine, the best translation, and the speech synthesis engine during the bilingual communication process. The software application retrieves the moderator input for the direct translation through the moderator interface. This method of intervention is the most intrusive to the bilingual communication process and creates a long response time between the first user and the second user, but it provides the most accurate translation for the voice phrase. In addition, the moderator can intervene by directly translating the textual phrase from the first language to the second language without the best translation. In order for the moderator to intervene in this manner, the software application begins by sending the textual phrase in the first language from the speech recognition engine to the moderator interface. The software application will retrieve the moderator's input through the moderator interface in order to convert the textual phrase from the first language to the second language. Finally, the software application will send the textual phrase in the second language to the speech synthesis engine. This method of intervention by the moderator is somewhat intrusive to the bilingual communication process and create a somewhat long response time between the first user and the second user.

A bilingual video chat process follows the same sequence as the bilingual communication conversation for the software application in terms of communication and translation between the first user and the second user. The primary difference is that the software application displays a video feed between the first user interface and the second user interface that allow the first user and the second user to see each other. The most unique aspect of the bilingual video chat is that the software application will display a speech bubble on both the first user interface and the second user interface. The speech bubbles will provide a smoother conversation cadence. The speech bubble can display the textual phrase in the first language on the first user interface and can display the textual phrase in the second language on the second language interface. The speech bubble will also contain an activity indicator, which notifies the first user and the second user when the software application is translating the textual phrase or when the other user is speaking.

Another feature of the bilingual communication process is the ability to have a conversation with random contacts. For this feature, the software application searches for a plurality of close proximity contacts by retrieving their location data. In the preferred embodiment, the location data is retrieved by global positioning system (GPS) coordinates for mobile electronic communication devices. The software application will then prompt the first user to choose a contact from the plurality of close proximity contacts. The software application connects the first user interface to said random contact with the second user interface, which allows the first user and the contact to have a phone call conversation.

Although the invention has been explained in relation to its preferred embodiment, it is to be understood that many other possible modifications and variations can be made without departing from the spirit and scope of the invention as hereinafter claimed.

What is claimed is:

1. A method of ranking language translations by executing computer-executable instructions stored on a non-transitory computer-readable medium, the method comprises the steps of:
   providing a plurality of translation sources, wherein said plurality of translation sources includes a machine language-translation engine, a human language-translation database, a language-translation storage database, and a parallel language content database;
   retrieving a message in an original language through a user interface;
   compiling a plurality of applicable translations for said message in a preferred language by referring to the plurality of translations sources;
   determining an accuracy score for each of said plurality of applicable translations, wherein said accuracy score for a particular translation from said plurality of applicable translations is weighed by commonalities between said plurality of translation sources, a user input process, and a linguistic mapping process;
   displaying said accuracy score of each of said plurality of applicable translations with said plurality of applicable translations on said user interface;
   prompting to choose a best translation from said plurality of applicable translation;
   recording each of said plurality of applicable translations in said language-translation storage database, wherein each of said plurality of applicable translations comprises a total rating and a total number of reverse requests; and
   continuously updating said total rating and said total number of reverse requests for each of the plurality of applicable translations.

2. The method of ranking language translations by executing computer-executable instructions stored on a non-transitory computer-readable medium, the method as claimed in claim 1 further comprises the step of:
   increasing accuracy score of a particular translation, if said particular translation is provided by more than one translation source.

3. The method of ranking language translations by executing computer-executable instructions stored on a non-transitory computer-readable medium, the method as claimed in claim 1 further comprises the steps of:
   prompting to choose between a positive rating and a negative rating for each of said plurality of applicable translations;
   retrieving said positive rating or said negative rating for each of said plurality of applicable translations through said user interface;
   increasing said total rating of said particular translation, if said particular translation retrieved said positive rating;
   decreasing said total rating of said particular translation, if said particular translation retrieved said negative rating;
   prompting to enter a free form correction, if each of said plurality of applicable translations received a negative rating;
   retrieving said free form correction and storing said free form correction into human language-translation database; and
   assigning said free form correction as said best translation.

4. The method of ranking language translations by executing computer-executable instructions stored on a non-transi tory computer-readable medium, the method as claimed in claim 3 further comprises the steps of:

increasing said accuracy score of said particular translation, if said particular translation has a higher total rating among said plurality of applicable translations; and decreasing said accuracy score of said particular translation, if said particular translation has a lower total rating among said plurality of applicable translations.

5. The method of ranking language translations by executing computer-executable instructions stored on a non-transitory computer-readable medium, the method as claimed in claim 1 further comprises the step of:

adding to said total number of reverse requests for said particular translation, if said particular translation is requested as an input phrase in the preferred language.

6. The method of ranking language translations by executing computer-executable instructions stored on a non-transitory computer-readable medium, the method as claimed in claim 5 further comprises the steps of:

increasing said accuracy score of said particular translation, if said particular translation has a higher total number of reverse requests among said plurality of applicable translations; and decreasing said accuracy score of said particular translation, if said particular translation has a lower total number of reverse requests among said plurality of applicable translations.

7. A method of implementing the ranked language translations by executing computer-executable instructions stored on a non-transitory computer-readable medium, the method comprises the steps of:

providing a speech recognition engine and a speech synthesis engine;

providing a plurality of applicable translations between a first language and a second language, wherein each of the plurality of applicable translations has an accuracy score;

providing a best translation from said plurality of applicable translations, wherein said best translation has highest accuracy score;

retrieving accelerometer data in order to execute a bilingual conversation process;

providing an electronic communication device, wherein said electronic communication device comprise an accelerometer, a microphone, and a speaker;

receiving an upright signal from said accelerometer;

receiving an upside-down signal from said accelerometer in order to activate said microphone;

retrieving a voice message in said first language from said microphone;

transcribing said voice message into a textual message with said speech recognition engine;

displaying said textual message in said first language on said user interface;

receiving a tilt signal from said accelerometer in order to convert said textual message from said first language to said second language with said best translation with said highest accuracy score;

displaying said textual message in said second language on said user interface;

converting said textual message into said voice message with said speech synthesis engine; and sending said voice message in said second language to said speaker;

retrieving moderator input data in order to execute a bilingual communication process; and displaying subtitle data on an user interface in order to execute a bilingual video chat process.

8. The method of ranking language translations by executing computer-executable instructions stored on a non-transitory computer-readable medium, the method as claimed in claim 7 further comprises the steps of:

receiving a speech phrase in said first language from a first user interface;

transcribing said speech phrase into a textual phrase with said speech recognition engine;

converting said textual phrase from said first language into said second language with said best translation with said highest accuracy score;

correcting said textual phrase in second language with said moderator input, wherein said moderator input is retrieved from a moderator interface;

converting said textual phrase into a voice phrase with said speech synthesis engine; and sending said voice phrase in said second language to a second user interface.

9. The method of ranking language translations by executing computer-executable instructions stored on a non-transitory computer-readable medium, the method as claimed in claim 8 further comprises the steps of:

displaying said textual phrase in said first language, said best translation, and said highest accuracy score through said moderator interface;

prompting to accept or decline said best translation for said textual phrase in said first language; and retrieving said moderator input through said moderator interface, if said best translation is declined through said moderator interface.

10. The method of ranking language translations by executing computer-executable instructions stored on a non-transitory computer-readable medium, the method as claimed in claim 8 further comprises the step of:

directly translating said voice phrase from said first language to said second language without said speech recognition engine, said speech synthesis engine, and said best translation by retrieving said moderator input.

11. The method of ranking language translations by executing computer-executable instructions stored on a non-transitory computer-readable medium, the method as claimed in claim 10 further comprises the step of:

sending said voice phrase in said first language to said moderator interface;

retrieving said moderator input through said moderator interface in order to properly convert said voice phrase from said first language to said second language; and sending said voice phrase in said second language to said second user interface.

12. The method of ranking language translations by executing computer-executable instructions stored on a non-transitory computer-readable medium, the method as claimed in claim 8 further comprises the step of:

directly translating said voice phrase from said first language to said second language without said best translation by retrieving said moderator input.

13. The method of ranking language translations by executing computer-executable instructions stored on a non-transitory computer-readable medium, the method as claimed in claim 12 further comprises the steps of:

sending said textual phrase in said first language from said speech recognition engine to said moderator interface;

retrieving said moderator input through said moderator interface in order to convert said textual phrase from said first language to said second language; and sending said textual phrase in said second language to said speech synthesis engine.

14. The method of ranking language translations by executing computer-executable instructions stored on a non-transitory computer-readable medium, the method as claimed in claim 8 further comprises the steps of:
- displaying a video feed between said first user interface and said second user interface;
- displaying a speech bubble on said first user interface and said second user interface, wherein said speech bubble contains an activity indicator;
- displaying said textual phrase in said first language on said first user interface;
- displaying said textual phrase in said second language on said second user interface;
- displaying said activity indicator on said first user interface, wherein said activity indicator notifies said first user interface when said second user interface is retrieving said voice phrase or when said textual phrase is being translated; and
- displaying said activity indicator on said second user interface, wherein said activity indicator notifies said second user interface when said second user interface is retrieving said voice phrase or when said textual phrase is being translated.

15. The method of ranking language translations by executing computer-executable instructions stored on a non-transitory computer-readable medium, the method as claimed in claim 8 further comprises the steps of:
- searching for a plurality of close proximity contacts, wherein each of said plurality of close proximity contacts includes a location data;
- prompting to choose a contact from said plurality of close proximity contacts; and
- connecting said first user interface to said contact with said second user interface.

* * * * *